(12) United States Patent
Zafiroglu

(10) Patent No.: US 7,514,026 B1
(45) Date of Patent: Apr. 7, 2009

(54) METHOD FOR RECYCLING FLOOR COVERINGS

(75) Inventor: Dimitri Peter Zafiroglu, Centreville, DE (US)

(73) Assignee: DZS, LLC., Midlothian, VA (US)

( * ) Notice: Subject to any disclaimer, the term of this patent is extended or adjusted under 35 U.S.C. 154(b) by 0 days.

(21) Appl. No.: 11/948,437

(22) Filed: Nov. 30, 2007

(51) Int. Cl.
*B27N 3/05* (2006.01)

(52) U.S. Cl. .................. 264/112; 264/116; 264/122; 264/913

(58) Field of Classification Search ............... 264/122, 264/913
See application file for complete search history.

(56) References Cited

U.S. PATENT DOCUMENTS

| | | | |
|---|---|---|---|
| 4,568,581 A * | 2/1986 | Peoples, Jr. ............... 428/36.1 |
| 5,199,141 A * | 4/1993 | Trask et al. ............... 28/115 |
| 5,571,465 A * | 11/1996 | Gill et al. ............... 264/121 |
| 5,841,081 A * | 11/1998 | Thompson et al. ........ 181/286 |
| 6,024,818 A * | 2/2000 | Dunson et al. ............ 156/148 |
| 6,024,905 A * | 2/2000 | Doris ............... 264/121 |
| 6,060,145 A | 5/2000 | Smith et al. |
| 6,241,068 B1 * | 6/2001 | Meyer ............... 192/220.4 |
| 6,344,254 B1 | 2/2002 | Smith et al. |
| 6,576,176 B1 * | 6/2003 | Gebreselassie et al. ....... 264/115 |
| 6,623,676 B1 | 9/2003 | Davis et al. |
| 7,018,582 B2 | 3/2006 | Lewis |
| 7,022,751 B2 * | 4/2006 | Zhang et al. ............... 523/206 |
| 2002/0031653 A1 * | 3/2002 | Ricciardelli et al. ....... 428/297.4 |
| 2003/0075824 A1 * | 4/2003 | Moore et al. ............... 264/143 |

OTHER PUBLICATIONS

"Identifying Carpet Pile Fiber" a Technical Bulletin of The Carpet and Rug Institute, (Mar. 1999).
Pamphlet on the Shredmaster II by Hollingsworth, (date unknown).

* cited by examiner

*Primary Examiner*—Mary Lynn F Theisen
(74) *Attorney, Agent, or Firm*—The H.T. Than Law Group

(57) ABSTRACT

The present invention concerns a method for recycling used floor covering. Post-consumer or post-industrial fibrous floor coverings are shredded to form a fibrous dispersion. The dispersion is maintained at a content of about 20-65% low-melt thermoplastic. The shredded fibrous dispersion is conveyed into a chute feeder which converts it into a batt that is heated, compressed, and cooled to form a durable backing particularly suitable for flooring applications. The batt comprises vertical layers or strata of fibers to provide additional cushion for the backing. Additionally, a portion of the shredded fibrous dispersion can also be diverted and used to form a face layer and/or adhesive layer for a reconstituted floor covering.

38 Claims, 5 Drawing Sheets

METHOD FOR RECYCLING FLOOR COVERINGS

FIELD OF THE INVENTION

The present invention relates to a method for recycling floor coverings. More specifically, the present invention relates to a method wherein used fibrous floor covering is shredded, and the shredded fibrous dispersion is converted into batts that are heated, compressed, and cooled to form a reconstituted floor covering or a reconstituted backing for a floor covering.

BACKGROUND OF THE INVENTION

Recycling of fiber-faced floor coverings or carpets by mechanical shredding is commonly known in the art. Shredding separates most of the entrapped dirt and powderized binders or fillers. In many instances, the shredded carpet is converted into congealed granules or small solid pieces, which may be mixed with additional binders or compacted to form sheets, usually reinforced with glass scrims, to serve as stabilizing backings for tufted carpet tiling. Other uses of granulated recycled carpet materials include various molded plastic structures used in construction, furniture, or packaging.

Higher end uses of conventional recycled carpeting include cushioning structures. Such cushioning structures can be produced from carpet fibers that are pneumatically or centrifugally separated from trapped dirt or powderized binders. The separated fibers are used to prepare a non-woven web through various conventional textile web-forming methods including garnetting, air-laying, and cross-lapping. Web-forming is followed by dimensional stabilization methods including stitch-bonding and needlepunching. Needlepunching is a preferred method, because it provides the benefit of orienting a portion of the fibers in the normal direction, thereby improving cushion or compressive resilience. Frequently, binders are added to the textile sheet. The binders are selected so they soften, melt or set at temperatures lower than the melting temperatures of the fibers. Typically, the recycled fibers include polyolefins which start to soften around 125° C. Most commonly, the conventional webs reclaimed from recycled carpets do not have the facial integrity or durability to serve as directly exposed floor covering, and can only serve as carpet underlays under tufted or woven carpeting.

Commonly owned, co-pending U.S. patent application Ser. Nos. 10/307,186, 10/611,470 and 10/611,769 and commonly owned U.S. Pat. Nos. 6,936,327 and 7,255,761 disclose floor coverings wherein cushion is provided by the backings, which may include recycled carpeting. These backings are covered with fibrous face layers attached to the backing with a layer of adhesive therebetween. The face layers present the face of the carpet and are embossable to create a three dimensional configuration that provides stability to the floor coverings and minimizes planar expansion and contraction with temperature and humidity variations, thereby preventing warping, bulging or seam-separation on the floor.

The relative ease with which a face layer stabilizes fibrous backings of this type, which may have variable structural integrity, raises the possibility that such backings could also be formed from carpeting directly after shredding, without the use of textile processing or needlepunching, and without excluding short broken fibers or thermoplastic adhesive granules which tend to fall out during conventional carding, garneting, and needlepunching processes. It is also noted by the Inventor that most of the structures disclosed in the above commonly owned applications and patents, and a large percentage of commercial carpeting, contain polyolefins or other low-melt thermoplastic components, which soften and become tacky and bondable with heat and pressure at temperatures above 125° C. Such temperatures are well below the melting/softening temperature of the rest of the components. For instance, polyester or nylon soften and melt around 250° C., and natural fibers or aramids stay intact at temperatures well above 250° C. The percentage of polyolefins or other low-melt components in most commercial carpeting varies between 20% and 65%, raising the possibility that the entire dispersed mass can be thermally consolidated using appropriate temperatures, pressures and exposure times to produce backings for structures disclosed in the above commonly owned patent applications and patents. Alternatively, the dispersed mass can be compression molded to produce durable cushioning sheeting for end uses such as carpet underlays, shock absorbing pads, automotive floor or tank coverings, and the like.

SUMMARY OF THE INVENTION

The present invention concerns a method for recycling used floor covering. Post-consumer or post-industrial fibrous floor coverings are shredded into a fibrous dispersion. Thermoset polymeric material is then segregated and removed from the dispersion. The dispersion comprises both low-melt and high-melt thermoplastic material, and the dispersion is maintained at a content of about 20-65% low-melt thermoplastic. The shredded fibrous dispersion is conveyed into a chute feeder which converts it into a batt, which is heated, compressed, and cooled to form a durable backing particularly suitable for flooring applications.

The batt may comprise vertical strata or layers of fibers to provide additional cushion for the backing.

Optionally, a portion of the shredded fibrous dispersion can be diverted and used to form a face layer and/or adhesive layer for a reconstituted floor covering.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE INVENTION

Figure 1:
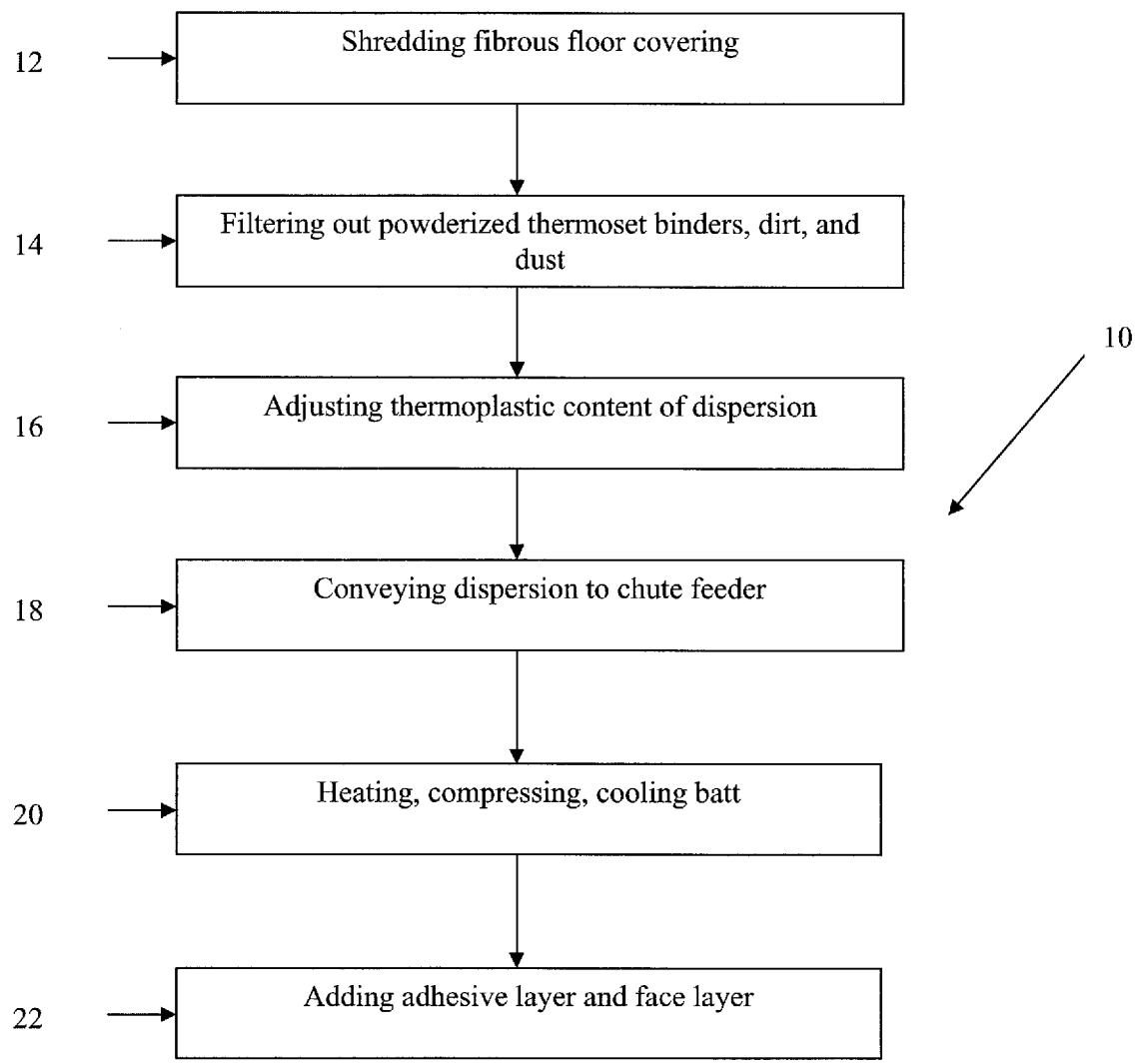
FIG. 1 is a schematic block flow diagram illustrating a method of recycling fibrous floor coverings.
Figure 2:
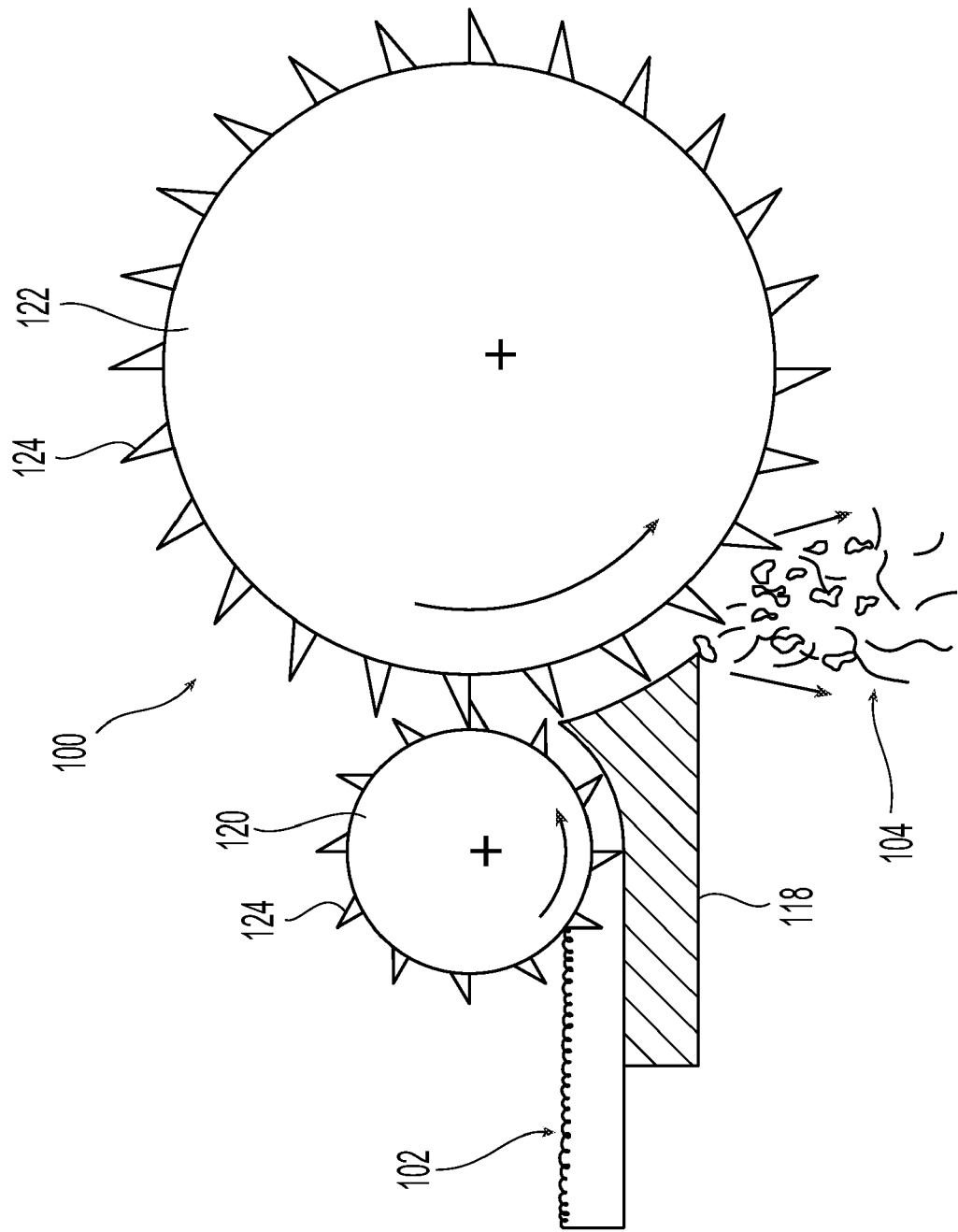
FIG. 2 is a schematic representation of a shredding apparatus.
Figure 4:
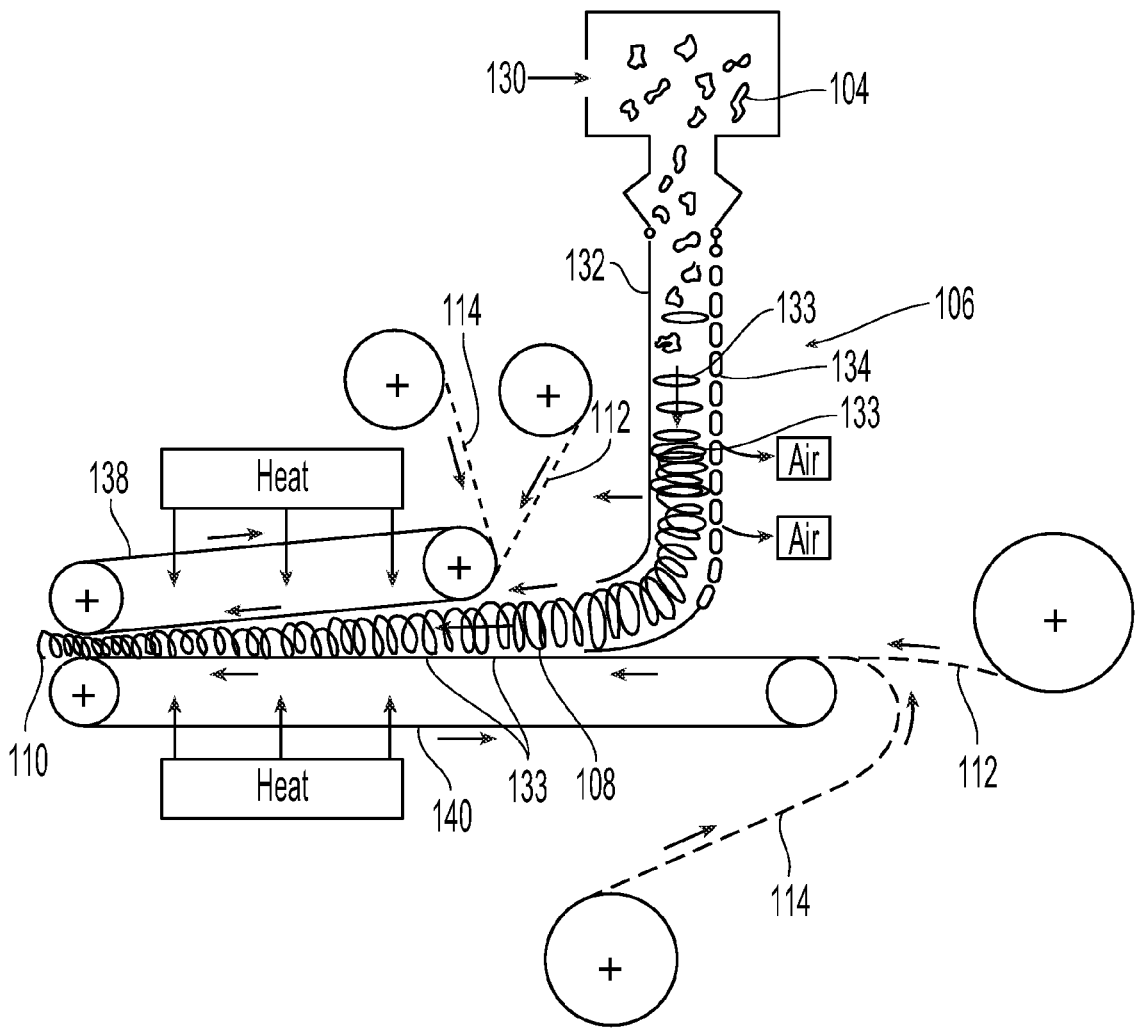
FIG. 4 is a schematic representation of a chute feeder apparatus.
Figure 5:
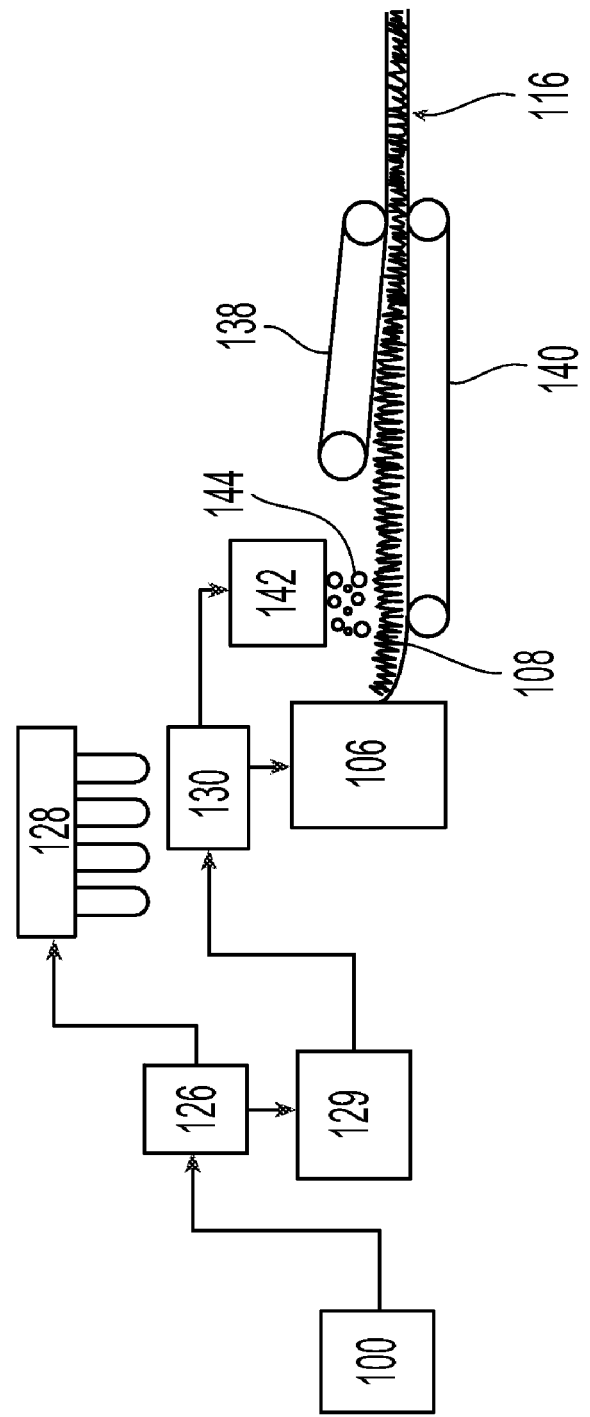
FIG. 5 is a schematic representation of a system for recycling fibrous floor coverings according to another embodiment of the present invention.

As schematically illustrated in FIG. 1, an embodiment of the present invention concerns a method 10 for recycling post-consumer or post-industrial (i.e., waste) fibrous floor covering into one or more layers of a reconstituted floor covering. Initially, in step 12, a conventional shredder 100 (such as the one shown in FIG. 2) cuts post-consumer/post-industrial fibrous floor covering 102 into a fibrous dispersion 104. Optionally, in step 14, dispersion 104 is filtered to remove any powderized material including thermoset binders, binder fillers, dirt, and dust. If necessary, in step 16, dispersion 104 is adjusted so that it comprises 20% to 65% low-melt thermoplastic content by adding low-melt or high-melt fibers. Subsequently, in an innovative aspect of the present invention, dispersion 104 is conveyed, preferably immediately, to a chute feeder 106 (shown in FIGS. 3A and 4) in step 18 to form a batt 108 that is heated, compressed, and cooled, in step 20, to produce a durable backing layer 110. In accordance with another feature of the present invention, the resultant durable backing layer 110 comprises fibrous strata or layers that are orientated vertically to the plane of batt 108, thus providing a better cushion. In step 22, adhesive layer 112 and face layer 114 (as shown in FIGS. 3B and 4) can be added to backing layer 110 in order to form a reconstituted floor covering 116. In one aspect of the invention, as shown in FIG. 5, dispersion 104 can also be used to form adhesive layer 112 and face layer 114.

Referring again to the flow diagram of FIG. 1, the recycling process 10 begins in step 12 when post-consumer or post-industrial fibrous floor covering 102 is shredded and opened to form a dispersion 104 comprising elements including, but not limited to, long fibers, short fibers, thermoplastic binder particles, powderized thermoset binder, and powderized dirt or dust. As depicted in FIG. 2, fibrous floor covering 102 is shredded and opened using any appropriate industrial shredder 100, which is capable of producing a well-separated dispersion from most types of waste fibrous floor coverings. A commercial example of such an industrial shredder 100 is the SHREDMASTER® (available from John D. Hollingsworth on Wheels, Inc. of Greenville, S.C.).

As illustrated in FIG. 2, floor covering 102 is fed into shredder 100 in such a way that it is juxtaposed between feed plate 118 and feed plate roller 120. The waste floor covering 102 may be fed into shredder 100 in any form including, but not limited to, baled bundles, loose scraps, or rolls. Floor covering 102 can be any fibrous floor covering including, but not limited to, tufted, woven, knit, knotted, or laminated products. In one embodiment, the present invention is directed towards recycling laminated multilayered fibrous floor coverings as described in commonly owned U.S. patent application Ser. Nos. 10/307,186 (published as US2004/0106345), 10/611,470 (published as US2004/0106346), 10/611,769 (published as US2005/0003141) and U.S. Pat. Nos. 6,936,327 and 7,255,761. These commonly owned published patent applications and patents are incorporated herein by reference in their entireties.

As a result of the counter-rotational action of feed plate roller 120 and high-speed disperser 122, each having a plurality of teeth 124, shredder 100 advantageously separates all the components of floor covering 100 into an open fibrous form rather than leave them in the form of yarn, ribbons, or strips. More particularly, floor covering 100 is shredded into a dispersion 104 comprising varying amounts of components, including but not limited to, long fibers, short fibers, thermoplastic binder particles, powderized thermoset binder, thermoset binder fillers such as chalk, and powderized dirt or dust. Advantageously, unlike the prior art, all of the original floor covering 100, including broken fibers, is collected as a dispersion 104. Preferably, about 20% to 65% of dispersion 104 is comprised of low-melt thermoplastic components such as fibers and thermoplastic binder particles comprised of chemical compounds such as polyolefins, which melt at temperatures about 20 to about 100° C. lower than high-melt components such as long fibers. As discussed in greater detail below, such dispersed low-melt thermoplastic content can advantageously be thermally consolidated to form a backing layer 110. It should also be noted that the thermoplastic binder particles tend to be softer, less powderized, and larger than thermoset binders or fillers when shredded.

Low-melt thermoplastic fibers typically have a melting point lower than about 150° C., and high-melt thermoplastic fibers typically have a melting point higher than about 200° C. Exemplary low-melt fibers include, but are not limited to, polyolefin fibers such as polyethylene or polypropylene. Exemplary high-melt fibers include, but are not limited to, polyester, nylon and the likes.

The entire fibrous dispersion 104 may be conveyed directly to the chute feeder 106 after step 12 if it comprises the preferred 20% to 65% thermoplastic content, contains minimal amounts of finely powderized non-thermoplastic materials such as thermoset binders and fillers, and is formed from either a post-industrial or cleaned post-consumer floor covering. However, some fibrous dispersions 104 such as soiled post-consumer floor coverings, may need further processing. For instance, in optional step 14, the dispersion 104 is conveyed over a first condenser 126 (shown in FIGS. 3A and 3B) having a relatively fine mesh (~10-20 mesh). The condenser 126 pneumatically or centrifugally extracts or filters out powderized thermoset binder, fillers, dirt and dust from dispersion 104, which are collected in fabric bags 128. The dispersion 104 then has a minimal amount of dirt, dust, and non-thermoplastic powder. In the case of thermoset binders, and especially those with inorganic fillers, because most of the binder is powderized, it separates with powderized dust and dirt when passed through condenser 126. In the case of thermoplastic binders, which are softer and tend to bend and conform to mechanical action, larger particulates and or granules are formed and, accordingly, only a minimal amount of thermoplastic binder passes through the fine-mesh condenser 126.

Figure 3A:
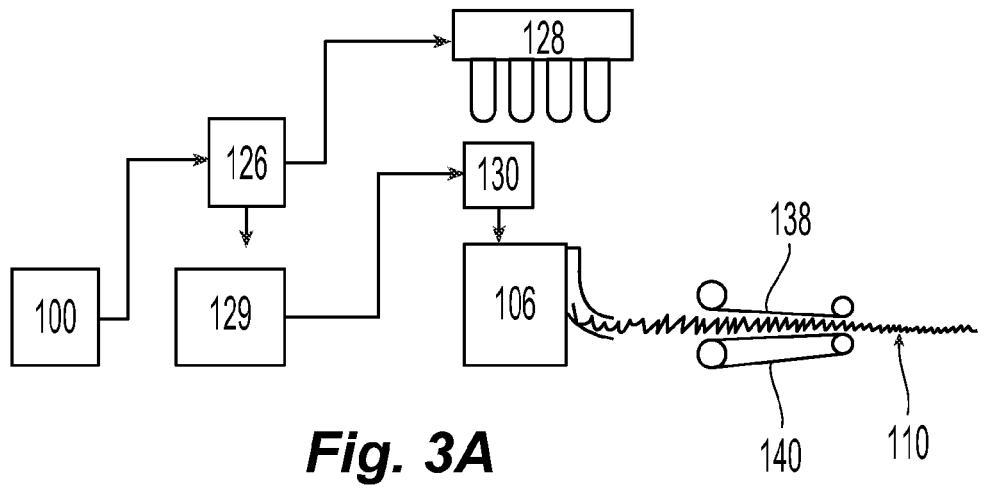
FIG. 3A is a schematic representation of a system for recycling fibrous floor coverings according to one embodiment of the present invention.
Figure 3B:
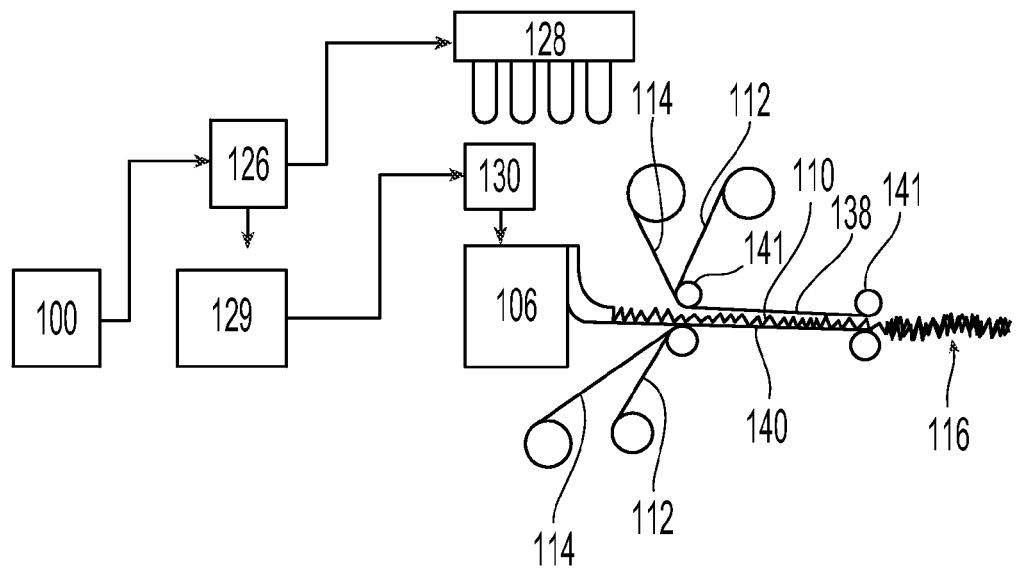
FIG. 3B is a schematic representation of a system for recycling fibrous floor coverings according to another embodiment of the present invention.

After step 14, the dispersion 104 is transferred to an accumulator 129 (shown in FIGS. 3A and 3B). In step 16, one has the option to add additional high-melt or low-melt fibers at the accumulator 129 in order to adjust, if necessary, the composition of dispersion 104 so that it then comprises 20% to 65% low-melt thermoplastic content. One of ordinary skill in the art can estimate the low-melt thermoplastic content of dispersion 104 by any commonly known tests such as a simple burn test, chlorine bleach test, or a chemical-dissolving test as described in *Carpet and Rug Institute Technical Bulletin: Identifying Carpet Pile Fiber* (March 1999), which is incorporated herein by reference in its entirety. For example, as an alternative a heated iron at a temperature of approximately 200° C. can be applied to the surface of a sample dispersion 104. If the entire sample dispersion 104 melts, then the dispersion likely contains 100% low-melt polypropylene fibers. Otherwise, the sample dispersion may contain about 70%-80% high-melt nylon or polyester fibers and about 20-30% low-melt polypropylene fibers.

In step 18, the dispersion 104 is transferred to a chute feeder 106 via a second condenser 130, as schematically illustrated in FIG. 4. The chute feeder 106 reorients strata 133 or layers 133 of reclaimed fibers which are orientated substantially horizontally into substantially perpendicular, or vertical, strata 133 or layers 133 of reclaimed fibers that form a batt 108, which becomes the backing layer 110 of a reconstituted floor covering 116. While strata 133 or layers 133 are substantially vertical, the reclaimed fibers therewithin may be vertical, horizontal or diagonal within each stratum/layer. Strata 133 are formed by virtue of the fibers being deposited inside chute 106. It should be noted that as an alternative to adding a dispersion 104 containing waste material, virgin fibers, particulates, or powders can be also transferred to chute feeder 106 in order to form a backing layer 110.

When fibrous dispersion 104 enters chute feeder 106 from second condenser 130, the fibrous strata 133 initially have a horizontal orientation as they traverse downward through chute portion 132 comprising formina 134, which allow the egress of air. The oscillation of the chute and the extraction of air allow the fibrous strata 133 to be subsequently compacted. Advantageously, before the fibrous layers exit from chute portion 132 onto a dual-belt laminator, the fibrous strata 133 turn about 90 degrees to form a recycled batt 108 having a basis weight of 10-50 oz/yd$^2$(340-1700 gm/m$^2$). The vertical orientation of the fibrous strata 133 relative to the top/bottom surfaces enhances the cushioning properties of the backing layer 110 formed from recycled batt 108. More particularly, backing layer 110 has a better cushion than carded, lapped or air-laid structures wherein the fibers are laid generally horizontally substantially along the top and bottom surfaces.

In an innovative aspect of the invention, the vertically oriented batt 108, which contains vertically oriented fibrous strata, undergoes thermal consolidation in step 20, discussed above, to form a backing layer 110. Thus, unlike the prior art, there is no need to use thermoset binders, textile staple processing, or needlepunching to bind the fibers of batt 108 together. The thermal consolidation process of step 20 comprises two phases: (i) heating with simultaneous compression and (ii) cooling.

Referring to FIG. 4, the bulky batt 108 is heated as it is being gradually compressed such that the low-melt thermoplastic short fibers and binder particles melt or become tacky while the remainder of the batt components remains unchanged. Exposing the batt 108 to a temperature that is at least 20° C.-100° C. below the melting point of the high-melt fibers for 15-45 seconds is sufficient to soften the low-melt short fibers and binder particles without melting the rest of batt 108 content. Exemplary heating temperatures are in the range of 150° C.-240° C., preferably 200° C.-240° C. Moreover, such temperatures heat and sanitize batt 108.

Heating under high compression can produce a relatively flat, low-cushion structure and may prolong the time needed for heat to reach all layers. Thus, preferably heat is applied to batt 108 by applying heat and compression gradually. Heating with simultaneous gradual compression can be accomplished using a dual-belt laminator comprising heated elements 138, 140 (shown in FIG. 4), located above and below batt 108, which can gradually compress batt 108 as they raise its temperature. The space or gap between heating element 138 and 140 gradually decreases in the direction of movement of batt 108 or the machine direction. The narrowing of this gap compresses batt 108. Heating elements 138 and 140 can be raised to the same temperature or different temperatures. As batt 108 is compressed, the fiber layers expand or buckle into each other, thus helping to improve sheet integrity. Alternatively, heating can also be accomplished within an "air-thru" oven without compression, followed by application of cooling pressure at the exit point (not shown).

The high performance backing layer 110 produced from the heating, compressing, and cooling of batt 108 has a density in the range of about 0.05 to about 0.25 gms/cm$^3$ (or about 50 to about 250 kg/m$^3$, or about 84 to about 421 lbs/yd$^3$) and exhibits excellent integrity and cushioning as shown in FIG. 3A. The backing layer 110 can be used to produce reconstituted fibrous floor coverings 116 including, but not limited to, the laminated composites described in the commonly owned patents and patent applications. As shown in FIG. 3B, in order to produce such laminated composites, a low-melt thermoplastic adhesive layer 112 and a durable fibrous face layer 114 are brought into contact with each other by means of rollers 141 and then laminated in-line or embossed to either face of backing layer 108 in step 22, as schematically illustrated in FIG. 4. It should be noted that in FIGS. 3B and 4, rollers 141 are shown on both sides of backing 108 to illustrate the possibility that layers 112, 114 can be added to any one side of backing 108. FIGS. 3B and 4 are not meant to illustrate that layers 112, 114 are added to both sides of backing 108.

Adhesive layer 112 and fibrous face layer 114 can be added after backing layer 110 is formed from heating, compressing, and cooling batt 108. Alternatively, batt 108 can be first formed and then adhesive layer 112 and face layer 114 can be positioned on top of batt 108 and then the composite is heated, compressed, and cooled.

FIG. 5 illustrates another embodiment of the present invention, wherein not only backing layer 108, but also adhesive layer 112 and fibrous face layer 114 can be produced using dispersion 104. More particularly, in this embodiment, second condenser 130 comprises a relatively coarse mesh (~2-4 mesh) that removes short fibers and thermoplastic binder particles, which are then deposited by an air-lay device 142 or by an equivalent brush, dispersing device or sifting device, as an adhesive and fiber blend 144 over chute-batt 108. Such air-laid short fibers and thermoplastic binder particles form semi-fibrous durable face layer 112 and adhesive layer 114 blended together. In this manner, a reconstituted floor covering 116 can be constructed entirely from the shredded dispersion of the original floor covering 100.

Backing layer 110 can be modified in still other ways. For instance, backing layer 110 can be embossed on the top surface. Moreover, backing layer 110 can be reinforced by attaching a reinforcing sheet underneath it upon exit from chute feeder 106.

Still other possible embodiments of the present invention are possible. For instance, multiple shredding and separating stages are possible. By way of example, after batt 108 is formed, it can be reintroduced into a second shredder for finer redispersing, and then conveyed into a second chute feeder to form a final batt, which is then heated, compressed, and cooled.

EXAMPLES

In the following examples, the Inventor evaluates the properties of Comparative Examples A-C and inventive Examples 1-5. In particular, as discussed in greater detail below and summarized in Table 1, the Inventor evaluated recycled content, abrasion resistance, cushioning, and edge fraying in each Example.

Comparative Example A is a floor covering having a laminated multilayered textured composite as described in Examples 1 and 2 of U.S. patent application Ser. Nos. 10/307, 186 and 10/611,470, whereas Comparative Examples B and C are a conventional tufted carpet and a conventional tufted polypropylene carpet, respectively.

Like Comparative Example A, inventive Examples 1-5 are laminated fibrous floor coverings having a structure as described in U.S. patent application Ser. No. 10/611,470, but each inventive Example has at least a backing layer produced according to the recycling method of the present invention. In inventive Examples 1-4, the fibrous face layers utilized virgin fibers and the adhesive layers utilized virgin polyethylene films. Thus, in Table I, the Actual Recycled Content % was calculated on this basis. However, the fibers contained in the face layers are also available from recycled sources, and the polyethylene film contained in the adhesive layers can also be substituted with recycled thermoplastic dispersions. Thus, in Table I, the Maximum Potential Recycled Content % is calculated assuming the use of such recycled materials. In inventive Example 5, recycled fibers were used in each layer.

Abrasion resistance tests, which closely correlate to floor trafficking, were conducted in a Vetterman drum test apparatus. The drum is lined with test samples into which is placed a 7.3 kilogram (16 pound) steel ball which rolls randomly inside the rotating drum. The Vetterman drum test apparatus has a speed of about 17 revolutions per minute or 1000 revolutions per hour, and it reverses direction every 100 revolutions. After about 5000 revolutions, the samples are removed and inspected to evaluate appearance retention. Abrasion resistance is reported on a scale of 1-4 with a rating of 4 indicating no perceptible face damage, a rating of 3 indicating moderate deterioration, a rating of 2 indicating visible but acceptably small facial deterioration, and a rating of 1 indicating unacceptable abrasion.

For each Example, a cushion test was performed before and after subjecting a floor covering to 5000 Vetterman cycles. More specifically, in each cushion test, a deflection value was calculated by subtracting the floor covering's measured thickness between a near-zero load and 200 psi (i.e., a load of 200 lbs applied with a footprint of one square inch, roughly simulating the load of a person stepping on a floor covering). A deflection of approximately 50 mils is the transition point between acceptable and unacceptable cushion. More particularly, a deflection of less than approximately 50 mils is considered unacceptable.

Comparative Example A

Laminated Textured Composite

A floor covering comprising a laminated multilayered textured composite, having a basis weight of 38 oz/yd$^2$, was prepared as described in Example 1 of U.S. patent application Ser. No. 10/611,470. The backing layer was a commercial carpet padding material, which was labeled as comprising 100% recycled (50% post-consumer) nylon and polypropylene waste fibers. The fibers appeared to be needled to form a backing layer having a basis weight of 27 oz/yd$^2$, and further bonded with a low-melt adhesive applied on both sides of the backing. A combination of two layers of black polyethylene utility film having a basis weight of about 4.0 oz/yd$^2$ was placed on top of the backing, and a fibrous outer layer consisting of a needlepunched felt fabric comprised of polyester fibers and weighing about 7.0 oz/yd$^2$ was placed on top of the dual layers of film.

As noted in Table 1, Comparative Example A had a marginally acceptable cushion, and the backing fibers had a tendency to loosen at cut edges. It also had a chemical odor.

Comparative Example B

Tufted Nylon Carpet

A commercially available tufted loop-pile carpet with nylon pile fibers and polypropylene woven primary and secondary backings was tested (purchased from Lowe's Home Improvement in Greenville, S.C.). The carpet was labeled as having a nylon pile weight of 28 oz/yd$^2$, and did not have any recycled content.

As noted in Table 1, Comparative Example B exhibited excellent abrasion resistance but lost cushion down to a marginal level. Furthermore, the fibers easily unraveled and loosened at edges.

Comparative Example C

Tufted Polypropylene Carpet

A commercially available tufted loop-pile carpet with polypropylene pile fibers and polypropylene primary and secondary backings was tested (purchased from Lowe's Home Improvement in Greenville, S.C.). The carpet was labeled as having a pile weight of 30 oz/yd$^2$, and did not have any recycled content.

As noted in Table 1, Comparative Example C exhibited good abrasion resistance but lost cushion to unacceptable levels (i.e., a deflection of 35 mils). Furthermore, the fibers easily unraveled and loosened at edges.

Example 1

Laminated Textured Composite with Backing Layer Comprising Material Recycled from Tufted Nylon Carpet A floor covering comprising a laminated multilayered textured composite, having a structure as described in U.S. patent application Ser. No. 10/611,470, was produced using a recycled backing layer formed according to an embodiment of the present invention.

The tufted nylon carpet of Example B was shred through a SHREDMASTER® II system manufactured by John D. Hollingsworth on Wheels, Inc. of Greenville, S.C. having the general configuration shown diagrammatically in FIG. 2. The dispersion was filtered through a condenser equipped with a 20 mesh screen having an open area of 65%, and the powderized thermoset binder and binder filler were collected in fabric bags as illustrated in FIG. 3A. The remainder of the dispersion comprised long fibers and very short fibers, but did not comprise any visible thermoplastic binder particles. No dirt or dust was extracted as the shredded carpet was new and unused. One square yard of carpet weighing 63 oz. yielded 16 oz. of powderized thermoset binder and binder filler and 47 oz. of a fibrous mix (i.e. the long and short fibers).

As shown in FIG. 3A, the fibrous dispersion mix was conveyed through an accumulator to a chute feeder with a second condenser. More thermoset binder and binder filler, weighing 2.5 oz/yd$^2$, were extracted from the dispersion by means of a second condenser into secondary collection bags (not shown). Thus, about 45.8 oz/yd$^2$ or about 72.7% of the original carpet entered the chute feeder for recycling.

A chute-batt, weighing 31 oz/yd$^2$ with an initial height of T=3", was compressed within a 40 second interval to a thickness of t=0.4" by means of a press having upper and lower platens heated to 220° C. and allowed to cool. The press simulated a dual-belt laminator such as the one shown in FIG. 4. The resultant backing layer appeared to have cushioning characteristics at least as good as the backing used in Comparative Example A.

The backing layer produced above was combined with a 7 oz/yd$^2$ fibrous face layer 114 and a 4.3 oz/yd$^2$ polyethylene film adhesive layer 112. The resulting laminated textured composite had better properties than Comparative Example A. Specifically, as noted in Table 1, Example 1 has superior cushion and better cushion retention than Comparative Example A. There was no looseness, dust, or particle fallout from the final product of Example 1. Further, the floor covering had an actual recycled content of 74% (i.e., 31 oz/yd$^2$ out of 42 oz/yd$^2$). If fully recycled fibers were used in the face layer, the floor covering would have had a recycled content of 90% (i.e., 38 oz/yd$^2$ out of 42 oz/yd$^2$). Additionally, if recycled thermoplastic binder were used instead of virgin polyethylene film, then the floor covering would have had a recycled content of 100% (i.e., 42 oz/yd$^2$ our of 42 oz/yd$^2$)

Example 2

Laminated Textured Composite Produced by Recycling the Floor Covering of Example 1

A floor covering comprising a laminated multilayered textured composite, having a structure as described in U.S. patent application Ser. No. 10/611,470, was produced by recycling the floor covering of Example 1. Shredding one square yard of Example 1 weighing 42 oz. yielded a mixture that could be directly conveyed to the chute feeder without losing any material through the condensers. The mixture contained long fibers, short fibers, thermoplastic granules, and thermoplastic binder particles that were mostly attached to the long or short fibers. A chute-batt weighing 34 oz/yd$^2$ was subjected to the recycling process described above in Example 1 to produce a backing layer. After combining the backing layer with a 7 oz/yd$^2$ fibrous face layer and a 4.3 oz/yd$^2$ polyethylene film adhesive layer, a laminated textured composite with a basis weight of 45 oz/yd$^2$ was produced.

As noted in Table I the final floor covering had excellent physical properties, and 100% of the original product (i.e. Example 1) was used to construct it. Although it contained only 76% recycled content, Example 2 could potentially be constructed using 100% recycled materials similar to Example 1.

Example 3

Laminated Textured Composite Produced by Recycling the Floor Covering of Example 2

A floor covering comprising a laminated multilayered textured composite, having a structure as described in U.S. patent application Ser. No. 10/611,470, was produced by recycling the floor covering of Example 2. The process described above in Example 2 was repeated to form a backing layer and then a new laminate with excellent physical properties as noted in Table 1.

Example 4

Laminated Textured Composite with Backing Layer Comprising Material Recycled from Used Laminated Textured Composite Built with Virgin Materials A floor covering comprising a laminated multilayered textured composite, also having a structure as described in U.S. patent application Ser. No. 10/611,470, was produced using a recycled backing layer formed from a used laminated textured composite, also having a structure as described in U.S. patent application Ser. No. 10/611,470. The initial laminated textured composite was built using virgin materials. It had a basis weight of 40 oz/yd$^2$ and was comprised of a 24 oz/yd$^2$ needlepunched backing layer containing 65% polyester and 35% polypropylene, a polyester face fabric weighing 7.5 oz/yd$^2$, and two layers of polyethylene film each weighing 4.5 oz/yd$^2$.

After two months of use, the post-consumer laminated textured composite was shred as described in Examples 1, 2, and 3 to produce a fibrous dispersion. The soiled product had picked up approximately 1 oz/yd$^2$ of dirt and dust, which essentially came out through a first condenser (shown in FIG. 3A). The remainder of the fibrous dispersion was conveyed into the chute feeder to build a backing layer weighing 29 oz/yd$^2$. The final laminate further included a 7 oz/yd$^2$ fibrous face layer and a 4 oz/yd$^2$ adhesive film layer, and had a total basis weight of 40 oz/yd$^2$. As noted in Table 1, it also exhibited excellent properties.

Example 5

Laminated Textured Composite Wholly Comprising Recycled Content

A floor covering comprising a laminated multilayered textured composite was wholly produced using recycled content. The final product of Example 4 was subjected to the process shown in FIG. 5 and described above. The shredded material lost essentially no powder going through the first condenser. When going through the second, coarser condenser (2-mesh), shorter fibers and binder particles were separated from the longer fibers. Approximately 22% of the shredded mass consisting of short fibers and binder particles was then conveyed to a hopper/brush and deposited upon a chute-batt derived from the long fibers, thereby forming a multilayered composite. The total final weight was 50 oz/yd$^2$ (i.e., 11 oz/yd$^2$ from the short fibers and binder particles, and 39 oz/sq/yd$^2$ from the long fibers). No fabric or film was added. The final product had acceptable performance as noted in Table I and had no waste, no fallout, no dusting and no loose fibers. Its top surface was semi-fibrous with protruding fiber ends through the binder layer. It had 100% recycled content and utilized 100% of the original floor covering from Example 4.

TABLE 1

| PROPERTY | EXAMPLE | | | | | | | |
| --- | --- | --- | --- | --- | --- | --- | --- | --- |
| | A | B | C | 1 | 2 | 3 | 4 | 5 |
| Total weight (oz/yd$^2$) | 38 | 63 | 67 | 42 | 45 | 51 | 40 | 50 |
| Actual recycled content (%) | 71 | — | — | 74 | 76 | 78 | 73 | 100 |
| Maximum potential recycled content (%)* | 100 | — | — | 100 | 100 | 100 | 100 | 100 |
| Vetterman performance (5,000 cycles)** | 3.5 | 4.0 | 3.5 | 3.5 | 3.0 | 3.5 | 3.5 | 2.5 |
| Frayed edges | YES | YES | YES | NO | NO | NO | NO | NO |
| Cushion Before Vetterman (mils)*** | 65 | 80 | 90 | 92 | 85 | 80 | 90 | 65 |
| Cushion After Vetterman (mils) | 55 | 55 | 35 | 78 | 70 | 70 | 75 | 55 |

TABLE 1-continued

| PROPERTY | EXAMPLE | | | | | | | |
| --- | --- | --- | --- | --- | --- | --- | --- | --- |
|  | A | B | C | 1 | 2 | 3 | 4 | 5 |
| Re-used portion of original carpet (%) | N/A | N/A | N/A | 72 | 100 | 100 | 100 | 100 |

*Assumes that fibrous face layer and adhesive layer come from recycled material.
**Abrasion resistance is reported on a scale of 1-4 with a rating of 4 indicating no perceptible face damage, a rating of 3 indicating moderate deterioration, a rating of 2 indicating visible but acceptably small facial deterioration, and a rating of 1 indicating unacceptable abrasion.
***Cushion is measured in terms of deflection under 200 psi. Approximately ≧50 mils appear to be acceptable.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for forming a portion of a surface covering comprising the steps of:
   (a) conveying a dispersion of low-melt thermoplastic components and high-melt thermoplastic components into a chute feeder, wherein the low-melt thermoplastic component has a melting temperature of at least about 20° C. below melting temperatures for the high-melt thermoplastic components;
   (b) maintaining about 20% to about 65% of the dispersion as the low-melt thermoplastic components;
   (c) forming a batt with the dispersion;
   (d) applying heat from above or below the batt, wherein the heat temperature is below the melting temperatures for high-melting components;
   (e) applying pressure to the batt to compact the batt to form a sheet; and
   (f) cooling the sheet, wherein before the step (a) the dispersion is produced by shredding a fibrous floor covering, wherein between steps (c) and (d), the batt is again shredded and then conveyed into a second chute feeder to form a second batt.

2. The process of claim 1, wherein the batt weighs about 10 oz/yd² to about 50 oz/yd².

3. The process of claim 1, wherein the sheet has a density in the range of about 0.05 to about 0.25 g/cm³.

4. The process of claim 1 further comprising a step of adding a fibrous face layer or a step of adding an adhesive layer.

5. The process of claim 1, wherein the heat temperature is from about 150° C. to about 240° C.

6. The process of claim 1 further comprising the step of embossing the batt.

7. The process of claim 1 wherein in step (d) heat is applied from above and below the batt.

8. A process for forming a portion of a surface covering comprising the steps of:
   (a) conveying a dispersion of low-melt thermoplastic components and high-melt thermoplastic components into a chute feeder, wherein the low-melt thermoplastic component has a melting temperature of at least about 20° C. below melting temperatures for the high-melt thermoplastic components;
   (b) maintaining about 20% to about 65% of the dispersion as the low-melt thermoplastic components by the step of adding low-melt or high-melt thermoplastic material to the dispersion;
   (c) forming a batt with the dispersion;
   (d) applying heat from above or below the batt, wherein the heat temperature is below the melting temperatures for high-melt components;
   (e) applying pressure to the batt to compact the batt to form a sheet; and
   (f) cooling the sheet.

9. The process of claim 8, wherein the batt weighs about 10 oz/yd² to about 50 oz/yd².

10. The process of claim 8, wherein the sheet has a density in the range of about 0.05 to about 0.25 g/cm³.

11. The process of claim 8 further comprising a step of adding a fibrous face layer or a step of adding an adhesive layer.

12. The process of claim 8, wherein the heat temperature is from about 150° C. to about 240° C.

13. The process of claim 8 comprising the step of embossing the batt.

14. The process of claim 8 wherein in step (d) heat is applied from above and below the batt.

15. A process for forming a portion of a surface covering comprising the steps of:
   (a) conveying a dispersion of low-melt thermoplastic components and high-melt thermoplastic components into a chute feeder, wherein the low-melt thermoplastic component has a melting temperature of at least about 20° C. below melting temperatures for the high-melt thermoplastic components;
   (b) maintaining about 20% to about 65% of the dispersion as the low-melt thermoplastic components;
   (c) forming a batt with the dispersion;
   (d) applying heat from above or below the batt, wherein the heat temperature is below the melting temperatures for high-melt components;
   (e) applying pressure to the batt to compact the batt to form a sheet; and
   (f) cooling the sheet,
wherein the dispersion comprises relatively short fibers and thermoplastic binder particles, wherein before step (a) some of the relatively short fibers and thermoplastic binder particles are filtered out of the dispersion, and wherein after step (c) the filtered fibers and thermoplastic binder particles are deposited over the batt.

16. The process of claim 15, wherein the batt weighs about 10 oz/yd² to about 50 oz/yd².

17. The process of claim 15, wherein the sheet has a density in the range of about 0.05 to about 0.25 g/cm³.

18. The process of claim 15 further comprising a step of adding a fibrous face layer or a step of adding an adhesive layer.

19. The process of claim 15, wherein the heat temperature is from about 150° C. to about 240° C.

20. The process of claim 15 further comprising the step of embossing the batt.

21. The process of claim 15 wherein in step (d) heat is applied from above and below the batt.

22. A process for forming a portion of a surface covering comprising the steps of:
   (a) conveying a dispersion of low-melt thermoplastic components and high-melt thermoplastic components into a chute feeder, wherein the low-melt thermoplastic component has a melting temperature of at least about 20° C. below melting temperatures for the high-melt thermoplastic components;
(b) maintaining about 20% to about 65% of the dispersion as the low-melt thermoplastic components;
(c) forming a batt with the dispersion;
(d) applying heat from above or below the batt, wherein the heat temperature is below the melting temperatures for high-melt components;
(e) applying pressure to the batt to compact the batt to form a sheet; and
(f) cooling the sheet,
wherein the thermoplastic components comprise fibers and the dispersion are arranged into a plurality of strata of fibers.

23. The process of claim 22, wherein the batt weighs about 10 oz/yd$^2$ to about 50 oz/yd$^2$.

24. The process of claim 22, wherein the sheet has a density in the range of about 0.05 to about 0.25 g/cm$^3$.

25. The process of claim 22, wherein before step (a) the dispersion is produced by shredding a fibrous floor covering.

26. The process of claim 25, wherein the fibrous floor covering comprises a laminated composite or tufted carpet.

27. The process of claim 25, wherein the fibrous floor covering comprises a post-industrial or post-consumer floor covering that contains substantially no thermoset polymer.

28. The process of claim 25, wherein the fibrous floor covering comprises a post-industrial or post-consumer floor covering that contains at least some thermoset polymer, dirt, or dust, and wherein before step (a) the thermoset binders, dirt, or dust are pneumatically or centrifugally extracted or filtered out of the dispersion.

29. The process of claim 22 further comprising a step of adding a fibrous face layer or a step of adding an adhesive layer.

30. The process of claim 29, wherein the fibrous face layer or adhesive layer is added after step (f).

31. The process of claim 29, wherein the fibrous face layer or adhesive layer is added after step (c).

32. The process of claim 22, wherein the heat temperature is from about 150° C. to about 240° C.

33. The process of claim 22 further comprising the step of embossing the batt.

34. The process of claim 22, wherein the sheet is reinforced by attaching a reinforcing layer to the sheet after step (f).

35. The process of claim 22 further comprising a step of aligning said strata of fibers substantially vertically relative to the plane of the batt.

36. The process of claim 35, wherein the step of aligning comprises a step of turning said strata about 90 degrees.

37. The process of claim 22, wherein in step (d) heat is applied from above and below the batt.

38. The process of claim 22 further comprising the step of adding a layer to any one side of the sheet.

* * * * *